United States Patent
Byeon

(10) Patent No.: US 10,722,834 B2
(45) Date of Patent: Jul. 28, 2020

(54) FUNCTIONAL FIBER FOR ADSORBING HEAVY METAL AND METHOD FOR PRODUCING SAME

(71) Applicant: Research Cooperation Foundation of Yeungnam University, Gyeongsangbuk-do (KR)

(72) Inventor: Jeong Hoon Byeon, Daegu (KR)

(73) Assignee: RESEARCH COOPERATION FOUNDATION OF YEUNGNAM UNIVERSITY, Gyeongsangbuk-do (KR)

( * ) Notice: Subject to any disclaimer, the term of this patent is extended or adjusted under 35 U.S.C. 154(b) by 244 days.

(21) Appl. No.: 15/777,282

(22) PCT Filed: Nov. 17, 2016

(86) PCT No.: PCT/KR2016/013272
§ 371 (c)(1),
(2) Date: May 18, 2018

(87) PCT Pub. No.: WO2017/086712
PCT Pub. Date: May 26, 2017

(65) Prior Publication Data
US 2018/0345204 A1 Dec. 6, 2018

(30) Foreign Application Priority Data

Nov. 18, 2015 (KR) .................. 10-2015-0161978

(51) Int. Cl.
*B01D 39/16* (2006.01)
*B01D 53/64* (2006.01)
(Continued)

(52) U.S. Cl.
CPC ..... *B01D 53/0407* (2013.01); *B01D 39/2065* (2013.01); *B01D 53/02* (2013.01);
(Continued)

(58) Field of Classification Search
CPC .......................... B01D 39/2065; B01D 53/02; B01D 53/0407; B01D 2239/0258;
(Continued)

(56) References Cited

U.S. PATENT DOCUMENTS

2003/0203009 A1* 10/2003 MacDonald .............. A61L 9/01
424/443
2003/0226443 A1* 12/2003 Rajagopalan .......... B01D 53/02
95/133
(Continued)

FOREIGN PATENT DOCUMENTS

JP        2012-046822 A     3/2012
KR   10-2008-0013629 A     2/2008
(Continued)

OTHER PUBLICATIONS

Meng, W. et al., "Removal of Cd, Pb and Cu from Water Using Thiol and Humic Acid Functionalized Fe2O3 Nanoparticles," Advanced Materials Research, 2012, vols. 518-523, pp. 1956-1963.

*Primary Examiner* — Frank M Lawrence, Jr.
(74) *Attorney, Agent, or Firm* — Hammer & Associates, P.C.

(57) ABSTRACT

The present application relates to a functional fiber for adsorbing heavy metal and a method for producing the same, and the functional fiber for adsorbing heavy metal of the present application may have a structure in which thiolated metal nanoparticles are attached to a porous fiber, thereby minimizing the pore clogging of the porous fiber to remarkably improve the adsorption capacity of heavy metal materials, may be prepared by applying the dry technology without liquid impregnation, thereby minimizing the pore clogging of the porous fiber and fundamentally blocking the process wastewater generation, and is easy to implement the (Continued)

roll-to-roll system, so that continuous production is possible and thus productivity may be improved.

19 Claims, 2 Drawing Sheets

(51) Int. Cl.
| | |
|---|---|
| *B01D 53/04* | (2006.01) |
| *D06M 11/83* | (2006.01) |
| *B01D 53/02* | (2006.01) |
| *D06M 23/08* | (2006.01) |
| *B01D 39/20* | (2006.01) |
| *D06M 23/06* | (2006.01) |
| *B22F 1/02* | (2006.01) |
| *B22F 9/02* | (2006.01) |
| *B22F 1/00* | (2006.01) |
| *D06M 10/00* | (2006.01) |
| *B82Y 30/00* | (2011.01) |
| *D06M 101/40* | (2006.01) |

(52) U.S. Cl.
CPC .............. *B22F 1/02* (2013.01); *D06M 11/83* (2013.01); *D06M 23/06* (2013.01); *D06M 23/08* (2013.01); *B01D 2239/0258* (2013.01); *B01D 2239/0407* (2013.01); *B01D 2253/102* (2013.01); *B01D 2253/1122* (2013.01); *B01D 2253/202* (2013.01); *B01D 2253/25* (2013.01); *B01D 2253/34* (2013.01); *B01D 2257/60* (2013.01); *B01D 2257/602* (2013.01); *B01D 2258/0283* (2013.01); *B01D 2258/0291* (2013.01); *B22F 1/0018* (2013.01); *B22F 9/026* (2013.01); *B22F 2303/20* (2013.01); *B22F 2304/05* (2013.01); *B82Y 30/00* (2013.01); *D06M 10/001* (2013.01); *D06M 2101/40* (2013.01); *D10B 2101/12* (2013.01); *D10B 2401/10* (2013.01); *D10B 2505/04* (2013.01)

(58) Field of Classification Search
CPC ...... B01D 2239/0407; B01D 2253/102; B01D 2253/1122; B01D 2253/202; B01D 2253/25; B01D 2253/34; B01D 2257/60; B01D 2257/602; B01D 2258/0283; B01D 2258/0291; B22F 1/0018; B22F 1/02; B22F 2303/20; B22F 2304/05; B22F 9/026; B82Y 30/00; D06M 10/001; D06M 11/83; D06M 11/2101; D06M 11/40; D06M 23/06; D06M 23/08; D10B 2101/12; D10B 2401/10; D10B 2505/04
USPC ...... 95/133, 134; 96/108, 154; 210/688, 508
See application file for complete search history.

(56) References Cited

U.S. PATENT DOCUMENTS

| | | | |
|---|---|---|---|
| 2015/0368122 | A1* | 12/2015 | Valiente Malmagro .................... B01J 20/3007 210/679 |
| 2016/0083901 | A1* | 3/2016 | Niedermeyer ........ D06M 23/02 442/59 |

FOREIGN PATENT DOCUMENTS

| | | |
|---|---|---|
| KR | 10-2008-0098115 A | 11/2008 |
| KR | 10-2009-0048703 A | 5/2009 |
| KR | 10-2011-0076280 A | 7/2011 |
| KR | 10-1364245 B1 | 2/2014 |

* cited by examiner

[Figure 1]
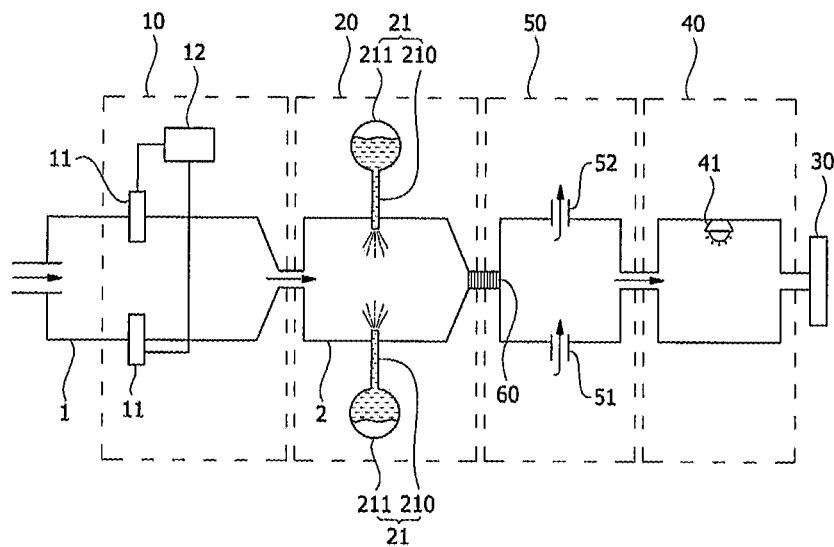
[Figure 2]
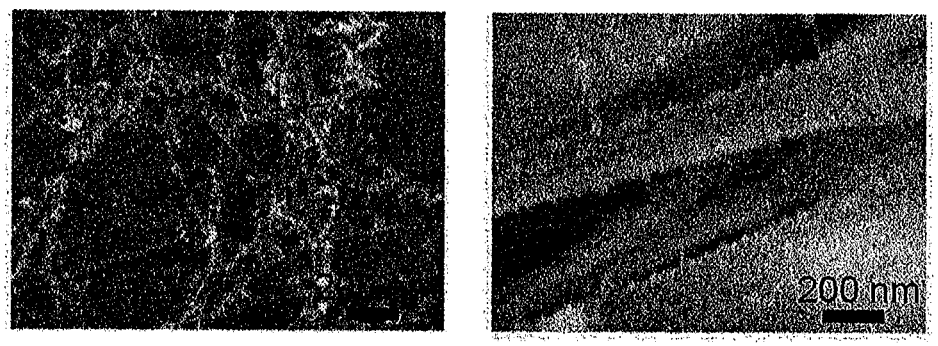

[Figure 3]
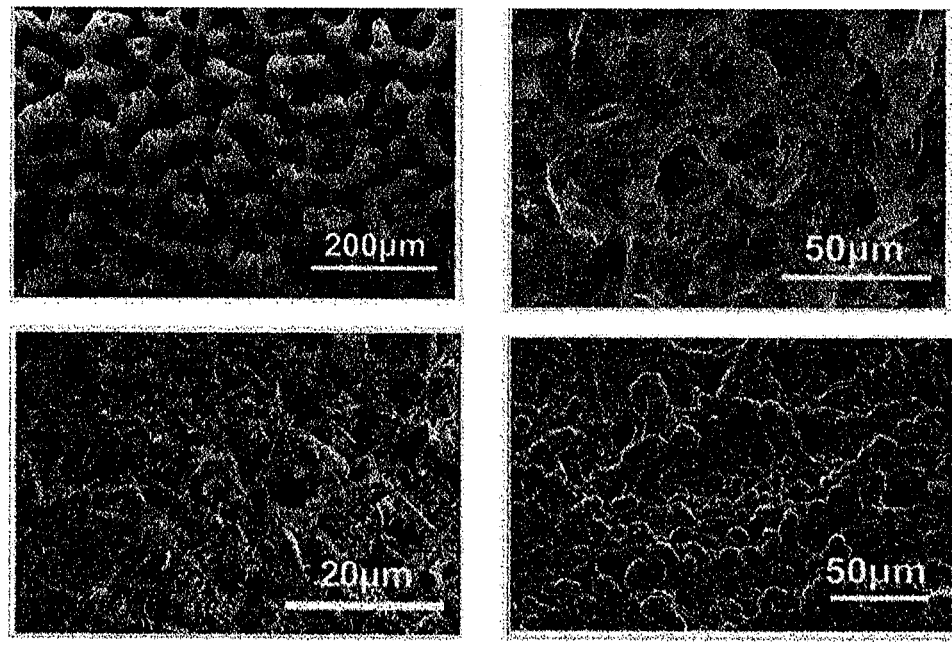
[Figure 4]
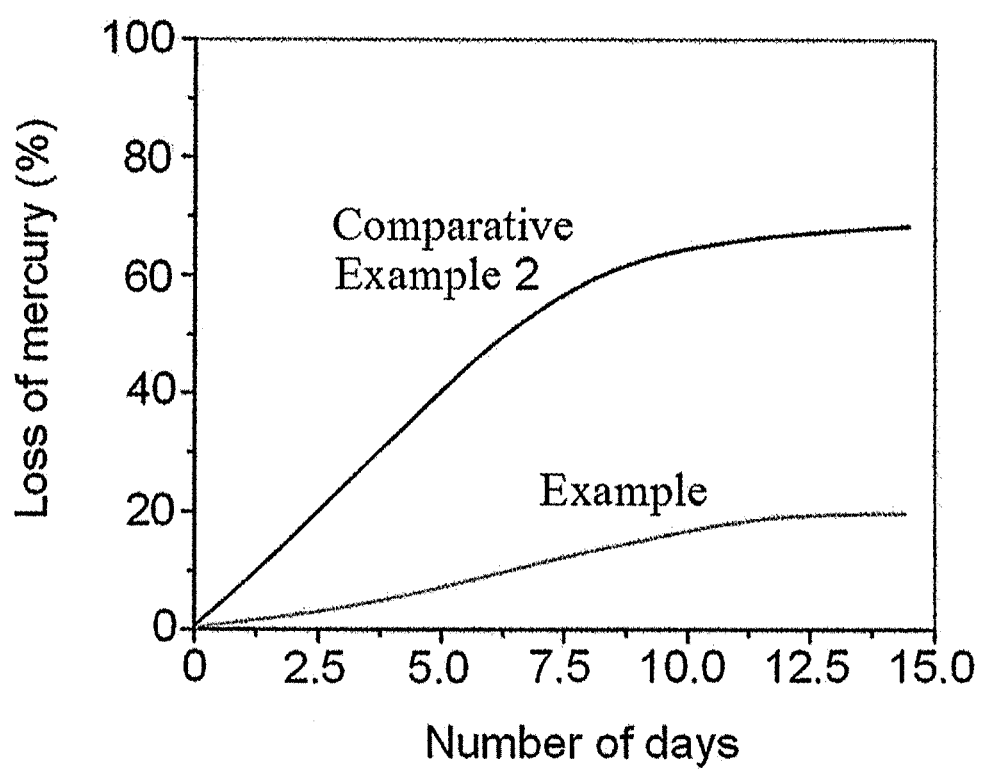

FUNCTIONAL FIBER FOR ADSORBING HEAVY METAL AND METHOD FOR PRODUCING SAME

TECHNICAL FIELD

The present invention relates to a functional fiber for adsorbing heavy metal that thiolated metal nanoparticles are attached to a porous fiber, and a production method and a production apparatus thereof.

BACKGROUND ART

As the damage of the direct and indirect environmental pollution related to the industry continues, environment friendly methods and environmental pollution prevention technologies are attracting attention, and techniques for adsorbing or stabilizing various environmental pollutants are actively studied. In particular, it has been found that heavy metal substances of environmental pollutants inhibit or interfere with essential chemical action of cells or biomaterials (biomolecules) present in the body, and pose a fatal risk to biochemical function of biological species through action of modifying or damaging properties of biomembranes in the body. The risk of these heavy metal substances can be confirmed through the case of itai-itai disease caused by cadmium intoxication and the case of Minamata disease caused by mercury intoxication.

Heavy metal vapor such as mercury that can be discharged into the atmosphere is mostly generated during coal combustion, but while the incineration scale of urban and medical wastes increases in recent years, the generation amount increases. In addition, in order to improve safety and efficiency in the natural gas process, it is necessary to efficiently remove the heavy metal vapor. Natural gas contains up to 200 ppbv of mercury, which does not only lead to severe corrosion of heat exchangers and metal surfaces during the processes, but also poses a risk that natural gas process operators may be exposed to high concentrations of mercury, and results in a problem of accelerating poisoning phenomena of high-priced metal catalysts, such as platinum and palladium, in the process.

Ion exchange, chemical precipitation, electrochemical (electrolytic) methods, and the like are progressing as methods for removing such heavy metal materials. However, these methods have drawbacks such as economical disadvantages in equipment and operation, a process problem due to complicated steps in the process, and low abatement efficiency in low concentration heavy metal materials. The removal of heavy metal materials using adsorbents has been studied for performance as an adsorbent for various materials because of advantages showing process convenience, economical efficiency, and high removal efficiency even in low concentration heavy metal materials.

In addition, attempts have been made to improve desorption of heavy metal materials using chemical adsorption by impregnating sulfur of chalcogen elements. However, there is a problem that results in lifetime reduction due to decrease of carbon fiber pores by the impregnation of liquid sulfur and increase of emission matter amounts in the manufacturing process.

In this regard, Korean Laid-Open Patent Publication No. 2008-0013629 disclosed a method of coating functional nanoparticles on the surface of an activated carbon fiber filter, but did not provide an alternative to the above problem.

DISCLOSURE

Technical Problem

It is an object of the present application to provide a functional fiber for adsorbing heavy metal having a high adsorption capacity.

In addition, it is another object of the present application to provide a method and an apparatus for producing a functional fiber for heave metal adsorption which can fundamentally block the generation of process wastewater by applying a dry technique without liquid-phase impregnation, and can also implement a roll-to-roll system to enable continuous production, thereby increasing productivity.

Technical Solution

The present application relates to a functional fiber for adsorbing heavy metal and a method for producing the same, in which the adsorption capacity of heavy metal substances is remarkably improved by attaching thiolated metal nanoparticles to a porous fiber.

Hereinafter, the present invention will be described in detail.

One embodiment of the present invention relates to a functional fiber for adsorbing heavy metal comprising a porous fiber and thiolated metal nanoparticles attached to the porous fiber.

Since the porous fiber comprises pores having a predetermined size and shape, it can exhibit high heavy metal material removal efficiency with a wide specific surface area.

As long as the porous fiber has pores, the type is not particularly limited, and for example, may be a porous carbon fiber, a porous ceramic fiber, a porous metal fiber and a porous polymer fiber, and the like, and preferably may be a porous carbon fiber.

The thiolated metal nanoparticles are metal nanoparticles having thiol groups introduced on the surface thereof, which can improve desorption characteristics of the adsorbed heavy metal materials by containing sulfur. In addition, the thiolated metal nanoparticles may be attached to the porous fiber to minimize pore clogging of the porous fibers, thereby improving the adsorption efficiency of heavy metal materials.

If the metal nanoparticles are nanoparticles made of metal, the kind thereof is not particularly limited, but may be preferably a transition metal. For example, the metal may be nickel, molybdenum, cobalt, iron and an alloy of two or more thereof, and the like and may be preferably a nickel-molybdenum alloy, where these may be used alone or in a mixture of two or more, but are not limited thereto.

The diameter of the metal nanoparticles is not particularly limited, which may be, for example, 200 nm or less, and may be preferably 20 nm to 200 nm. If the diameter of the metal nanoparticles is less than 20 nm, their collection efficiency to a porous fiber may be rapidly lowered in the case of applying electrostatic attraction when the thiolated metal nanoparticles are attached to the porous fiber, whereas if it exceeds 200 nm, there may be a problem that the adhesion between the metal nanoparticles and the fiber is reduced due to reduction of the surface area of the particles.

The concentration of the metal nanoparticles is not particularly limited, which may be used, for example, at a number concentration of $10^3$ to $10^{10}/cm^3$. If the number concentration is less than $10^3/cm^3$, the number of metal nanoparticles is low, so that the process yield is low, whereas if the number concentration is more than $10^{10}/cm^3$, the metal aerosol nanoparticles collide with each other, so that there may be a problem that they are agglomerated.

As the functional fiber for adsorbing heavy metal according to the present application has a structure in which thiolated metal nanoparticles are attached to the porous fiber, the pore clogging of the porous fiber is minimized, so that the specific surface area thereof is very high. For example, the functional fiber may have a specific surface area of 1000 $m^2/g$ or more, preferably 1500 $m^2/g$ or more. The functional fiber having the specific surface area in the above range may have remarkably excellent heavy metal material adsorption performance. The larger the specific surface area, the heavy metal material adsorption performance is more improved, and thus the upper limit is not particularly limited. However, the upper limit may be 2500 $m^2/g$ in terms of productivity and processability, but is not limited thereto.

The functional fiber for adsorbing heavy metal according to the present application can be usefully used as a material for forming a heavy metal adsorbent. For example, the functional fiber for adsorbing heavy metal according to the present application can be used as heavy metal adsorbents by forming woven or knitted fabrics or nonwoven fabrics. The heavy metal adsorbent according to the present application can be used for the purpose of adsorption of radioactive substances, reduction of noxious gases, and the like.

The present application also relates to a method for producing a functional fiber for adsorbing heavy metal. One embodiment of the method for producing a functional fiber for adsorbing heavy metal according to the present application comprises steps of: producing metal nanoparticles through a low-temperature plasma particle generator; injecting a thiol solution onto the metal nanoparticles to prepare thiolated metal nanoparticles; and attaching the thiolated metal nanoparticles to a porous fiber.

Hereinafter, one embodiment of the production method of the present application will be described in detail.

First, metal nanoparticles are produced through a low-temperature plasma particle generator in an inert gas flow.

The inert gas is used as a carrier gas for the metal nanoparticles. In one example, the inert gas may function to transport the metal nanoparticles to the porous fiber.

As the inert gas, an inert gas known in the art can be used without particular limitation. For example, the inert gas may be nitrogen, argon, helium, and the like, and may be preferably nitrogen. The inert gases may be each used alone or in a mixture of two or more.

The metal nanoparticles are produced through a low-temperature plasma particle generator. The low-temperature plasma particle generator is a method of vaporizing a metal component by high heat generated with low-temperature plasma to form them, where the metal nanoparticles may be formed by generating the low-temperature plasma when a high voltage is applied to both metal electrodes, and vaporizing the metal component of the metal electrodes by high heat generated with low-temperature plasma and then condensing it.

At this time, the interval between both metal electrodes may be in a range of 0.5 mm to 10 mm. For example, when the interval between the metal electrodes is 1 mm, the metal component of the metal electrodes may be vaporized to form the metal aerosol nanoparticles, while high heat of 5000° C. or so is generated upon applying a high voltage of 2.5 kV to 3 kV. They may be produced by condensing the vaporized metal aerosol nanoparticles by a rapidly lowered environmental temperature during the movement of the vaporized metal aerosol nanoparticles to the low-temperature plasma outer region having a lower temperature than the low-temperature plasma generation point.

The high voltage power source applied to the metal electrodes may be a direct current or an alternate current, where in the case of an alternate current, the power application examples such as square waves, triangular waves and offset control may be more various.

Next, a thiol solution containing a thiol compound is injected onto the metal nanoparticles in the inert gas flow to prepare thiolated metal nanoparticles.

The thiol solution may be a solution comprising, as a compound capable of introducing thiol groups into the surface of the metal nanoparticles, for example, a thiol compound or a compound capable of attaching thiol groups to the surface of the metal nanoparticles through a reaction.

The type of the thiol compound capable of introducing thiol groups into the surface of the metal nanoparticles is not particularly limited, and for example, the compound may be an alkane thiol having 1 to 10 carbon atoms, a sulfate, a mercaptan, a sulfenyl, a sulfinyl, a sulfonamide, a sulfonic acid/sulfonate, a sulfinic acid/sulfinate, a sulfoxide, a thiourea, a thiocarbonyl, a thiol ester, a tosylate and a derivative thereof, and the like, where these may be each used alone or in a mixture of two or more, and may be preferably an alkane thiol, and may be 1-hexanethiol among the alkanethiols.

The compound capable of introducing thiol groups into the surface of the metal nanoparticles may be dissolved or dispersed in an appropriate solvent or dispersion medium to form a thiol solution. Such a solvent or dispersion medium is not particularly limited, which may include, for example, ethanol.

The concentration of the thiol compound capable of introducing thiol groups into the surface of the metal nanoparticles in the thiol solution is not particularly limited, but may be preferably from 0.01 to 50% by volume. When the concentration of the thiol compound is within the above-mentioned range, the thiol groups can be easily attached to the surface of the metal nanoparticles.

The injected thiol solution forms thiol droplets and as the metal nanoparticles are encapsulated in the thiol droplets, the thiol groups are introduced into the surface of the metal nanoparticles while surrounding the surface of the metal nanoparticles.

One embodiment of the present invention may further comprise an appropriate additional treatment process for introducing thiol groups to the surface of the metal nanoparticles. For example, it may further comprise an additional treatment process such as heat treatment and light irradiation, and may further comprise, preferably, a light irradiation step in a productive and process aspect.

Thiol groups which are negatively charged are electrostatically attached to metal particles which are positively charged by irradiating them with light in the light irradiation step to separate one or more electrons therefrom, whereby thiolated metal nanoparticles having remarkably improved adhesion performance can be produced.

The range of the wavelength of the light to be irradiated depends on the work function of the metal, and it is preferred that light below a wavelength in which the energy exceeding the work function of the metal is supplied is irradiated. For example, the wavelength of the light for producing the thiolated metal nanoparticles may be a wavelength of 230 nm or less. The type of this light may be exemplified by at least one of ultraviolet rays and X-rays, and in the case of X-rays, it is preferred to comprise soft X-rays.

The production method according to one embodiment of the present invention may further comprise a step of drying the solvent of the thiol droplets before the step of attaching the thiolated metal nanoparticles to the porous fiber.

The solvent of the thiol droplets may be removed by such a drying step. In the drying step, the drying temperature may be 40 to 200° C., and the drying step may be performed, for example, through a tubular furnace.

Next, the thiolated metal nanoparticles are attached to the porous fiber.

The thiolated metal nanoparticles may reach the porous fiber along the flow of a carrier gas, which is the inert gas, to be attached thereto.

In one embodiment, the attachment process may be performed by charging the thiolated metal nanoparticles and the porous fiber with opposite electric charges. For example, when the metal nanoparticles are positively charged, the attachment of the metal nanoparticles may be more rapidly performed by negatively charging the fiber with applying a pulse current or an alternate current thereto.

Furthermore, according to another embodiment, the attachment process may be performed through a temperature difference between the metal nanoparticles and the porous fiber. For example, since the metal nanoparticles have a characteristic of moving from a relatively high temperature to a low temperature, the attachment of the metal nanoparticles may be performed by cooling the porous fiber through the temperature difference with the metal nanoparticles. With regard to the cooling method of the porous fiber, for example, a cooling element may be disposed at one portion of a roll for conveying the porous fiber to cool the porous fiber.

The fiber may be a fiber forming a woven or knitted fabric or a nonwoven fabric, and accordingly, the production method of the present invention can be easily applied to a continuous process such as a roll-to-roll process, thereby improving productivity. Furthermore, the woven or knitted fabric or nonwoven fabric may be usefully used as a product for adsorbing heavy metal materials.

In another embodiment of the production method of the present application, the adsorption capacity of the functional fiber for adsorbing heavy metal may be remarkably improved by thiolating not only the metal nanoparticles but also the porous fiber itself.

As a specific embodiment, after unreacted thiol droplets or thiolated metal nanoparticles are loaded on the flow of the inert gas and attached to the porous fiber, thiol groups may be attached to the surface of the porous fiber by irradiating it with light.

More specifically, as described above in connection with the thiolation of the metal nanoparticles, the range of the wavelength of the light to be irradiated depends on the work function of the porous fiber, and it is preferred that light below a wavelength that the energy exceeding the work function of the porous fiber is supplied is irradiated.

In a preferred embodiment, when a porous fiber having a work function below the work function of the metal nanoparticles is used, the light used for the thiolization of the metal nanoparticles can be equally used for the thiolization of the porous fiber.

In a more preferred embodiment, when the light irradiation region includes the thiolated region of the metal nanoparticles and the porous fiber region while using the porous fiber having a work function below the work function of the metal nanoparticles, a single light irradiation can simultaneously thiolize the porous fiber as well as the metal nanoparticles.

Thus, the production method of the present application may be performed in a dry manner to minimize pore reduction and process wastewater generation due to the liquid phase impregnation method.

The present application relates to an apparatus for producing a functional fiber for adsorbing heavy metal.

Hereinafter, the production apparatus according to the present application will be described in more detail with reference to the drawings.

FIG. 1 is a schematic diagram of an apparatus for producing a functional fiber for adsorbing heavy metal according to one embodiment of the present application. As shown in FIG. 1, the production apparatus of the present application comprises a discharge part (10); a spray part (20) and a collection part (30).

The discharge part (10) is a part for generating metal nanoparticles from electrodes, where at the discharge part (10), a low-temperature plasma discharge is generated, and metal particles are generated from the electrodes made of a transition metal by the low-temperature plasma discharge.

In one example, the discharge part (10) is equipped with a pair of electrodes (11) spaced apart at a predetermined interval, although not shown, may comprise a gas supply device such as a carrier gas supply system and a flow meter such as an MFC (mass flow controller). In addition, an inert gas or nitrogen can be quantitatively supplied to a first chamber (1) by the gas supply device and the flow meter.

As the metal constituting the electrodes (11), a transition metal may be used, and when a high voltage is applied to the electrodes (11), the metal may be vaporized or granulated by a low-temperature plasma discharge and discharged into the spray part (20) along the inert gas or nitrogen flow flowing through the interval between the electrodes (11). For example, when a voltage is applied to the electrodes (11) of the discharge part (10), the metal is vaporized at the interval between the pair of electrodes (11) of the discharge part (10), and the vaporized metal moving along the carrier gas condenses out of the interval, thereby forming metal nanoparticles.

In one example, the discharge part (10) may comprise an electric circuit (12) for applying a high voltage to the electrodes (11). The electric circuit (12) has a constant voltage source structure composed of a high voltage source (HV), an external capacitor (C) and a resistor (R), which can control the size of the metal nanoparticles using a number of resistors, a number of capacitors and a circuit capable of high speed switching a circuit current.

Also, in the interval between the electrodes (11), for example, the electrode gap, which is the shortest distance between the electrodes (11), the shorter the distance is, the lower the ignition required voltage is, and the longer the distance is, the higher voltage is required. Furthermore, if the electrode gap is narrow, the voltage required to generate the spark is reduced, but a short spark can cause misfiring by transmitting the ignition minimum energy to a mixer, so that it is necessary to set an appropriate distance by an experiment. In one example, the gap between the electrodes may be 0.5 to 10 mm, but is not limited thereto.

The particle diameter of the metal nanoparticles generated from the discharge part (10) may be widely controlled from several nanometer units to hundreds of nanometer units, depending on the flow volume or the flow rate of an inert gas or nitrogen. For example, when the flow volume or the flow rate of the supplied inert gas or nitrogen is increased, an agglomeration phenomenon between the particles also decreases as the concentration of the metal nanoparticles decreases, where the size of nanoparticles may be reduced through this process. Also, the particle diameter, shape and density of the metal nanoparticles may be changed by spark generation conditions such as an applied voltage, a frequency, a current, a resistance and a capacitance value; the type and flow volume of the inert gas; or the shape of the spark electrode, and the like.

The inert gas can be exemplified by argon (Ar) or helium (He), and the like, but is not limited thereto.

The spray part (20) is a part for introducing thiol groups into the metal nanoparticles by injecting a solution containing a thiol compound onto the metal nanoparticles.

In one example, the spray part (20) comprises a spray device (21), where the spray device (21) may comprise a spray nozzle (210). The spray nozzle (210) may be composed of an upper spray nozzle and a lower spray nozzle. The particle diameter of the nozzle is not particularly limited, but may be 0.1 to 1.0 mm. In the spray part (20), the solution containing a thiol compound is sprayed in the droplet form into a second chamber (2) through the spray nozzle (210), whereby the metal nanoparticles generated in the discharge part can be encapsulated by the droplets.

In one example, the thiol compound may comprise one or more compounds selected from the group consisting of an alkane thiol having 1 to 10 carbon atoms, a sulfate, a mercaptan, a sulfenyl, a sulfinyl, a sulfonamide, a sulfonic acid/sulfonate, a sulfinic acid/sulfinate, a sulfoxide, a thiourea, a thiocarbonyl, a thiol ester and a tosylate.

The spray device (21) may further comprise a storage part (211) in which a solution mixing a thiol compound and a solvent is stored, and in one example, the spray device (21) may further comprise a stirrer for producing a solution by mixing a thiol compound and a solvent. The stirrer is not particularly limited as long as it is capable of high-speed stirring, and for example, it may be used without limitation as long as it has 200 to 4000 rpm and is a device capable of stirring by applying ultrasonic waves.

The production apparatus of the present application comprises a collection part (30) for attaching the thiol group-introduced metal nanoparticles to a porous fiber. In the collection part (30), the metal nanoparticles may be attached to the porous fiber to obtain the porous fiber to which the thiolated metal nanoparticles are attached.

As long as the porous fiber has pores, the type is not particularly limited, and for example, it may be a porous carbon fiber, a porous ceramic fiber, a porous metal fiber and a porous polymer fiber, and the like, and may be preferably a porous carbon fiber.

The production apparatus of the present application may further comprise a light irradiation part (40). The light irradiation part (40) is a part for irradiating the thiol group-introduced metal nanoparticles with ultraviolet rays having a wavelength range of 230 nm or less.

In one example, the light irradiation part (40) may comprise a light source (41) for irradiating the thiol group-introduced metal nanoparticles with light. The type of the light source (41) is not particularly limited, and for example, any device capable of irradiation of light carrying photon energy exceeding the work function of the transition metal, for example, light having a short wavelength of 230 nm or less may be used without limitation. For example, a known light source (41) such as a high-pressure mercury lamp, an ultra-high-pressure mercury lamp, a halogen lamp, a black light lamp, a microwave-excited mercury lamp, various lasers or X-rays may be used, or a similar reaction may also be induced by irradiation of soft X-rays in the flow of inert gas at room temperature. By using the light source (41) capable of irradiation of light having a short wavelength of 230 nm or less, electrons on the surface of the transition metal nanoparticles can be released and the electric charge on the metal surface can be induced to a positive charge.

The production apparatus of the present application may further comprise an extraction furnace (50) or a drying device for extracting the solvent between the spray part (20) and the light irradiation part (40).

As in FIG. 1, the extraction furnace (50) may comprise an inlet (51) and an outlet (52). In one example, the extraction solvent may be introduced into the extraction furnace (50) through the inlet (51) and the outlet (52) may discharge the mixture extracted by the extraction solvent.

In addition, as the drying device, a diffusion dryer may be used. For example, an absorption-adsorption type extraction bed containing activated carbon and silica may be filled in the inside of the diffusion dryer, where a first solvent may be extracted while passing the encapsulated droplets through hollows of the extraction bed.

Here, the term "extracted mixture" means a mixture comprising an extraction solvent and other materials extracted by the extraction solvent.

In one embodiment, the production apparatus may comprise a filter part (60) between the spray part (20) and the extraction furnace (50) and between the extraction furnace (50) and the light irradiation part (40). The filter part (60) may comprise a filter used for filtration purposes or the like. An example of the filter material may include a fluororesin such as PTFE (polytetrafluoroethylene); a polyamide-based resin such as nylon-6 and nylon-6,6; a polyolefin resin such as polyethylene and polypropylene (PP); and the like.

In addition, the pore diameter of the filter is not particularly limited, but may be, for example, 10 to 500 nm. By controlling the pore diameter of the filter to the above-mentioned range, it is possible to prepare nanoparticles with a uniform average particle diameter according to the present application.

In one example, the discharge part (10), the spray part (20) and the collecting part (30) may be maintained under an inert gas or nitrogen atmosphere. In other words, the fact to be maintained under the inert gas or nitrogen atmosphere may mean that the metal nanoparticles according to the present application sequentially move to the discharge part (10), the spray part (20) and the light irradiation part (30) along the flow of the inert gas or nitrogen.

Advantageous Effects

The functional fiber for adsorbing heavy metal of the present application may have a structure in which thiolated metal nanoparticles are attached to a porous fiber, thereby minimizing the pore clogging of the porous fiber to remarkably improve the adsorption capacity of heavy metal materials, may be prepared by applying the dry technology without liquid impregnation, thereby minimizing the pore clogging of the porous fiber and fundamentally blocking the process wastewater generation, and is easy to implement the roll-to-roll system, so that continuous production is possible and thus productivity may be improved.

BRIEF DESCRIPTION OF DRAWINGS

FIG. 1 is a schematic diagram of an apparatus for producing a functional fiber for adsorbing heavy metal according to one embodiment of the present application.

FIG. 2 is SEM photographs of the functional fiber for adsorbing heavy metal prepared in Example according to the production method of the present application.

FIG. 3 is SEM photographs of the functional fiber for adsorbing heavy metal prepared by the liquid phase impregnation process according to Comparative Example 1.

FIG. 4 is graphs comparing mercury desorption performance over time of the functional fiber prepared in Example and the activated carbon fiber of Comparative Example 2.

EXPLANATION OF REFERENCE NUMERALS

1: first chamber
10: discharge part
11: electrode
12: electric circuit
2: second chamber
20: spray part
21: spray device
210: spray nozzle
211: storage part
30: collection part
40: light irradiation part
41: light source
50: extraction furnace
51: inlet
52: outlet
60: filter

BEST MODE

Hereinafter, in order to facilitate understanding of the present invention, preferred examples are presented, but these examples are merely illustrative of the present invention and are not intended to limit the accompanying claims, where it is obvious to those skilled in the art that various changes and modifications can be made to Examples within the scope and technological thought range of the present invention and such changes and modifications are intended to be within the accompanying claims.

Example

Metal nanoparticles were prepared through a low-temperature plasma particle generator during flow of a 3 L/min nitrogen gas. Here, operating conditions of the low-temperature plasma particle generator are as follows: nickel for the positive electrode material, molybdenum for the negative electrode material, resistance 0.5 MΩ, capacitance 1.0 nF, load current 2 mA, applied voltage 2.8 kV and frequency 667 Hz.

Next, a 1-hexane thiol solution (concentration of 1-hexanethiol in solution: 10% by volume) diluted with ethanol was injected onto the prepared metal nanoparticles in the nitrogen gas flow with an atomizer (collision atomizer), and irradiated with light of 185 nm to prepare thiolated metal nanoparticles. Then, the prepared thiolated metal nanoparticles were passed through a tubular furnace at 120° C. to vaporize ethanol.

Next, the thiolated metal nanoparticles were loaded on the nitrogen gas flow, reached to the porous carbon fiber and attached thereto.

The prepared functional fiber has a specific surface area of 1700 m²/g and SEM photographs of the prepared functional fiber were shown in FIG. 2.

Comparative Example 1

Thiolated metal nanoparticles were attached to the porous fiber by a liquid impregnation method.

Specifically, the porous fiber was impregnated for 30 minutes in a 1-hexane thiol solution (concentration of 1-hexanethiol in solution: 10% by volume) diluted with ethanol in which nickel and molybdenum metal particles floated. The impregnated porous carbon fiber was then dried at 120° C. for 30 minutes.

The prepared functional fiber had a specific surface area of 900 m²/g and SEM photographs of the prepared functional fiber were shown in FIG. 3.

Comparing Example and Comparative Example 1, it can be seen that the adsorption performance is excellent because the specific surface area of Example is remarkably higher than that of Comparative Example.

Comparative Example 2

A general activated carbon fiber without attaching thiolated metal nanoparticles was prepared.

The mercury desorption performance of the functional fiber prepared in Example and the activated carbon fiber of Comparative Example 2 over time was compared and shown in FIG. 4.

As shown in FIG. 4, it can be confirmed that mercury desorption is remarkably suppressed in the functional fiber of the present application as compared with the activated carbon fiber of Comparative Example 2.

The invention claimed is:

1. A functional fiber for adsorbing heavy metal comprising a porous fiber and thiolated metal nanoparticles attached to the porous fiber.

2. The functional fiber for adsorbing heavy metal according to claim 1, wherein the porous fiber comprises a porous carbon fiber.

3. The functional fiber for adsorbing heavy metal according to claim 1, wherein the metal nanoparticles comprise one or more selected from the group consisting of a transition metal and an alloy of two or more thereof.

4. The functional fiber for adsorbing heavy metal according to claim 1, having a specific surface area of 1000 m²/g or more.

5. A heavy metal adsorbent comprising the functional fiber for adsorbing heavy metal of claim 1.

6. A method for producing a functional fiber for adsorbing heavy metal comprising steps of:
   producing metal nanoparticles through a low-temperature plasma particle generator;
   injecting a thiol solution containing a thiol compound onto the metal nanoparticles to prepare thiolated metal nanoparticles; and
   attaching the thiolated metal nanoparticles to a porous fiber.

7. The method for producing a functional fiber for adsorbing heavy metal according to claim 6, wherein the thiol compound comprises at least one compound selected from the group consisting of an alkane thiol having 1 to 10 carbon atoms, a sulfate, a mercaptan, a sulfenyl, a sulfinyl, a sulfonamide, a sulfonic acid/sulfonate, a sulfinic acid/sulfinate, a sulfoxide, a thiourea, a thiocarbonyl, a thiol ester and a tosylate.

8. The method for producing a functional fiber for adsorbing heavy metal according to claim 6, wherein the thiol compound in the thiol solution has a concentration of 0.01 to 50% by volume.

9. The method for producing a functional fiber for adsorbing heavy metal according to claim 6, wherein the step of producing thiolated metal nanoparticles comprises:

injecting a thiol solution containing a thiol compound onto metal nanoparticles to form thiol droplets and encapsulating the metal nanoparticles in the thiol droplets.

10. The method for producing a functional fiber for adsorbing heavy metal according to claim 6, further comprising a step of injecting the thiol solution onto the metal nanoparticles and then irradiating them with light having a wavelength of 230 nm or less.

11. The method for producing a functional fiber for adsorbing heavy metal according to claim 6, wherein the step of attaching the thiolated metal nanoparticles to a porous fiber is performed in a dry manner.

12. The method for producing a functional fiber for adsorbing heavy metal according to claim 6, the step of producing metal nanoparticles; the step of producing thiolated metal nanoparticles; and the step of attaching the thiolated metal nanoparticles to a porous fiber is performed in an inert gas flow.

13. The method for producing a functional fiber for adsorbing heavy metal according to claim 12, wherein the step of attaching thiolated metal nanoparticles to a porous fiber is a step of loading the thiolated metal nanoparticles on the inert gas flow, reaching the porous fiber and attaching them thereto.

14. The method for producing a functional fiber for adsorbing heavy metal according to claim 12, wherein the step of attaching thiolated metal nanoparticles to a porous fiber is performed by charging the thiolated metal nanoparticles and the porous fiber with opposite electric charges or through a temperature difference between the metal nanoparticles and the porous fiber.

15. The method for producing a functional fiber for adsorbing heavy metal according to claim 6, wherein the porous fiber forms a woven or knitted fabric or a nonwoven fabric.

16. An apparatus for producing a functional fiber for adsorbing heavy metal comprising:
 a discharge part for generating metal nanoparticles from electrodes made of a transition metal by a low-temperature plasma discharge;
 a spray part for injecting a solution containing a thiol compound onto the metal nanoparticles to introduce thiol groups onto the surface of the metal nanoparticles; and
 a collection part for attaching the thiol group-introduced metal nanoparticles to a porous fiber.

17. The apparatus for producing a functional fiber for adsorbing heavy metal according to claim 16, further comprising a light irradiation part for irradiating the thiol group-introduced metal nanoparticles with light having a wavelength range of 230 nm or less.

18. The apparatus for producing a functional fiber for adsorbing heavy metal according to claim 17, further comprising an extraction furnace or a drying device for extracting a solvent between the spray part and the light irradiation part.

19. The apparatus for producing a functional fiber for adsorbing heavy metal according to claim 16, wherein the discharge part, the spray part and the collection part are maintained under an inert gas atmosphere.

* * * * *